No. 739,001. PATENTED SEPT. 15, 1903.
W. HOOPES.
CONDUCTIVITY BRIDGE.
APPLICATION FILED JAN. 5, 1903.
NO MODEL.

Witnesses
R. M. Bowman
Jos. H. Lockwood

Inventor
William Hoopes
by John H. Holt
Attorney

No. 739,001. Patented September 15, 1903.

UNITED STATES PATENT OFFICE.

WILLIAM HOOPES, OF PITTSBURG, PENNSYLVANIA, ASSIGNOR TO THE LEEDS AND NORTHRUP COMPANY, OF PHILADELPHIA, PENNSYLVANIA, A CORPORATION OF PENNSYLVANIA.

CONDUCTIVITY-BRIDGE.

SPECIFICATION forming part of Letters Patent No. 739,001, dated September 15, 1903.

Application filed January 5, 1903. Serial No. 137,802. (No model.)

*To all whom it may concern:*

Be it known that I, WILLIAM HOOPES, a citizen of the United States, residing at Pittsburg, in the county of Allegheny and State of Pennsylvania, have invented certain new and useful Improvements in Conductivity-Bridges, of which the following is a specification.

This invention relates to improvements in electrical measuring instruments, and more especially to a direct-reading conductivity-bridge, the object of the said invention being the production of an apparatus which will determine with rapidity and accuracy the conductivity of metallic electrical conductors, such as copper, aluminium, alloys, iron, and the like.

The apparatus comprising my invention being direct-reading, the mathematical calculation usually found necessary in the determination of specific conductivity is eliminated, and the utmost speed and accuracy are attained in making a number of useful determinations. This feature renders the apparatus especially valuable to manufacturers who desire to determine the conductivity of a large number of samples of metals as they are being produced or of wire as it is being drawn.

Although there are many ways of determining the electrical conductivity, no fully satisfactory method has heretofore been embodied in a commercial apparatus. Moreover, the methods hitherto employed necessitate, in general, more or less calculation, which renders them slow and troublesome, while many are unreliable owing to certain temperature effects and others to the inherent inaccuracy arising from the instruments employed. According to my invention, in addition to doing away with calculation, disturbing temperature effects are also eliminated by employing a standard conductor of comparison of the same metal as the sample under test.

To these ends my said invention consists in the novel combination and arrangement of parts herein described and more particularly pointed out in the claims.

In order to more fully describe the said invention, reference will be had to the accompanying drawings, which illustrate a specific embodiment thereof, and in which—

Figure 1:
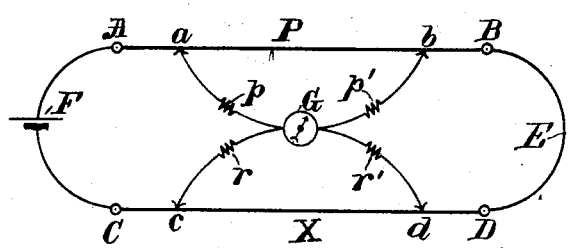
Figure 2:
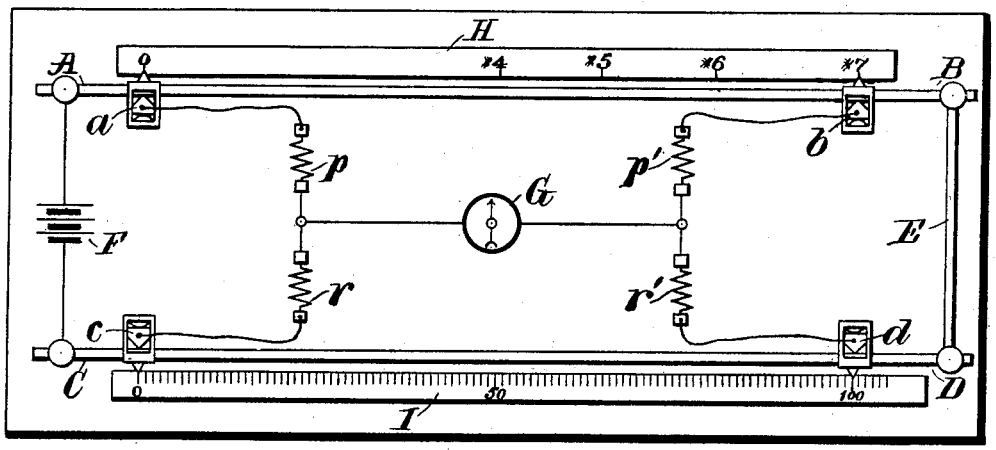
Figure 3:
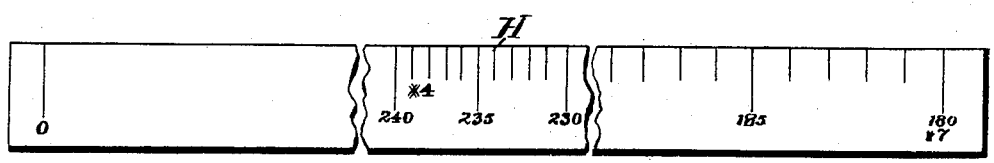

Figure 1 is a diagram illustrating the principle of the Kelvin bridge for comparing low resistances. Fig. 2 is a top plan view of a form of bridge embodying my invention; and Fig. 3 is an enlarged view of one of the scales, which may be graduated in diameters, weights, &c.

In carrying out the invention set forth above I may avail myself of any arrangement of circuits, apparatus, or bridge methods for comparing resistances which adapt themselves to my invention. The specific form of the invention herein shown is based upon Lord Kelvin's method of measuring low resistances. That method will therefore be first described, and then it will be shown how from it a conductivity-bridge embodying my invention may be constructed.

Referring to the diagram Fig. 1, which represents a Kelvin bridge, A B represent a conductor of known low resistance; C D, a conductor of unknown low resistance; E, a low-resistance yoke connecting conductors A B and C D in series. $r, p, r'$, and $p'$ are resistance-coils of several ohms resistance; $a, b, c$, and $d$, sliding contacts marking the points of the conductors A B and C D, between which are the resistances to be compared; F, a source of direct current, and G a galvanometer. Suppose we wish to find what length of the conductor C D will balance in resistance a given length $a\,b$ of the conductor A B whose resistance is known. Slides $a\,b$ are placed upon the points indicating the given length of the conductor A B the resistance of which is to be compared. The slide $c$ is then adjusted to a suitable point on conductor C D, and the slide $d$ is slid along said conductor until there is no deflection of the galvanometer G. When this is done, a balance is obtained, and the resistance X between $c$ and $d$ is equal to the resistance P between $a$ and $b$, assuming that $p=r=p'=r'$, from which it follows that the length of conductor C D, equal in resistance to the given length $a\,b$ of conductor A B, is the length included between the points $c$ and $d$. Maxwell, Price, and others who have given the theory of the Kelvin bridge show that if a balance is obtained and $\frac{p}{r}=\frac{p'}{r'}$ then $\frac{P}{X}=\frac{p}{r}=\frac{p'}{r'}$. If, therefore, we make $r$, $r'$, $p$, and $p'$ equal by construction, a balance will be had when P=X. As the resistance is proportional to the length, a shorter length of $c\,d$ will balance a shorter length of $a\,b$. Conductivity, however, is the reciprocal of resistance, so that if we assume the specific conductivity of conductor C D to be a certain amount when a length $c\,d$ thereof balances a length $a\,b$ of the conductor A B a greater length of conductor will be required to balance the length $a\,b$ if the specific conductivity of C D is increased. Therefore it will be seen that there is a direct relation between the conductivity of the conductor C D and the length thereof required to balance a given length of conductor A B. Moreover, if the conductors A B and C D are of the same material the resistance of one may be determined in terms of the resistance of the other without it being necessary to know the temperature of either, as per-cent. change in resistance due to change in temperature is the same for both conductors. It is only necessary to provide that during the measurement the temperature of both conductors shall remain the same.
My invention consists in the case illustrated in replacing the conductor A B of the Kelvin bridge by a conductor standardized as to specific percentage conductivity by determining what lengths of said conductor will balance in resistance, respectively, conductors of the same metal as the standard having given cross-sections or weights per unit of length and all of a given length and percentage conductivity, providing this standard conductor with a scale the graduations of which coincide with the lengths of the standard conductor above mentioned, marking these graduations by numbers indicating wire sizes, weights, or diameters for a given length of the specimen conductor to be measured, making the conductor C D the conductor whose diameter or weight for a given length or wire size is known, but whose percentage conductivity is to be determined, and providing this conductor with a scale which will indicate directly, a balance in resistance between the standard conductor and the specimen being obtained, the percentage conductivity of the specimen under test.
Referring to Fig. 2, which represents one form of my invention, H represents the scale for the standard conductor A B; I, the scale for the conductor C D, whose conductivity is to be determined; $a, b, c$, and $d$, suitable knife-edges or other sliding contacts with indices for the scales, and the other parts corresponding in the case shown to similarly-lettered parts of the Kelvin bridge, Fig. 1.
Before going into the detail description of my invention it may be well to define what is meant by a conductor having a specific conductivity of one hundred per cent. Assuming that this conductor is a rod of copper having a uniform cross-section, the resistance and its reciprocal (the specific conductivity) of such rod will depend upon the purity and the physical condition in regard to hardness, &c., of the copper of which it is made. Such a conductor would be said to have one hundred per cent. specific conductivity if its resistance is equal to the resistance of a rod having the same length and cross-section and made of a quality of copper such that the resistance between the two opposite faces of a centimeter cube of the material at a particular temperature is a certain specified amount. This specified amount is .000001594 of an international ohm at 0° centigrade and is called "Matthiessen's standard." This rod may, however, have a greater percentage conductivity than one hundred, in which case it is of a purer material than that chosen as a standard.
In making the bridge the standard conductor A B is selected of the same metal as the sample to be tested and is preferably of uniform though not necessarily known cross-section. The scale H for this standard is divided so that the graduations read either in diameters, weights, or standard-wire numbers of conductors of a given length. The graduations on scale H divide the standard conductor into lengths, the resistance of any of which will balance that of a conductor of the same metal having a given weight or cross-section and length and preselected conductivity—say one hundred per cent. For example, a graduation on the scale H, indicating No. 7 Brown & Sharpe wire or a certain number of grams or mils, is located such a distance from the zero-mark of the scale that a length of the standard conductor corresponding to such distance will balance in resistance a conductor of the same metal as the standard and of No. 7 wire gage or of a weight or diameter corresponding to the given graduation and of a given length and one hundred per cent. conductivity, both conductors being at the same temperature. This given length is arbitrary, but must be the same for all sizes of samples for which a given bridge is constructed and is taken as the distance between the "0" and "100" marks on the scale I. The points "0" "100" are therefore laid off on the scale I an arbitrary distance apart, and this distance is divided into one hundred equal divisions. Let it be assumed for the purpose of illustration that C D is a No. 7 Brown & Sharpe copper wire whose conductivity is to be measured. Then if slide $a$ is adjusted to the zero-mark of scale H and the slide $b$ located at that point where its index points to the graduation on scale H, which indicates No. 7 wire, and the slide $c$ is adjusted to the zero-mark of the scale I and a balance is obtained when the slide $d$ is opposite the "100" mark of the scale I the conductor C D will have one hundred per cent.

conductivity, for the resistance of the standard between $a$ and $b$ will then be equal to the resistance of the sample between $c$ and $d$, which resistance has been found to be that of a piece of No. 7 copper wire having a length $c\,d$. If the sample C D has a lower conductivity than one hundred per cent.—say, for example, fifty per cent.—then the resistance of the same length of the said conductor will be twice as great. Hence half its length will balance the resistance $a\,b$ of the standard. The slide $d$ will therefore rest upon the "50" division of the scale I when a balance is obtained and will show that the conductivity of the sample is fifty per cent. In like manner the various graduations on the scale I will represent the conductivities of other samples. In like manner other points, as "4," "5," and "6," on scale H are employed for measuring samples of different wire-numbers, weight, or cross-section. In some cases it happens that conductors have a higher percentage conductivity than one hundred per cent. of the Matthiessen standard. For this reason the scale I may be produced a slight distance beyond the "100" mark. Moreover, the scale may be placed either on the standard conductor or alongside of it, as shown.

The operation in determining the conductivity of a sample is extremely simple and is substantially as follows: The sample or conductor to be tested is cut to the required length and clamped in suitable binding-posts near its ends, and the slides $a$ and $c$ are adjusted to the zero-points of their respective scales. The slide $b$ is then placed so that its index will be opposite the graduation on scale H which indicates the size of the conductor to be tested. The slide $d$ is then slid along the conductor under test until a balance is had, when the graduation on the scale I opposite the index of said slide will indicate the percentage conductivity direct.

During a test the standard conductor should be of the same temperature as the specimen. This uniformity of temperature may be secured by placing the bridge in a metal-lined box or in any other suitable way. The slides may also be of any suitable construction and the indices provided with any desired arrangement for securing accuracy and delicacy of adjustment, these all being details of construction which may be varied widely without departing from the spirit of my invention; nor does it affect the principle of the invention as to the quantities which the graduations on the standard scale H are made to indicate. When it is stated that this scale is divided into graduations indicating the "sizes" of conductors to be tested, this term is to be understood as covering weights, diameters, standard-wire sizes, or any other quantities which may be selected.

Fig. 3 represents an enlarged view, with portions broken away, of the scale H graduated in diameters in mils, those diameters which coincide with standard-wire-gage numbers being indicated. For example, the division indicating a diameter of one hundred and eighty mils also indicates No. 7 Brown & Sharpe wire. The graduations may extend any distance on the scale H, but for any particular standard do not usually cover a range of more than three or four Brown & Sharpe wire-gage numbers. The scale H may be graduated in weights of the samples to be tested as follows: Let $W_d$ be the weight of A B, which is chosen of uniform cross-section. Let $W_s$ be the weight of any sample to be tested. Let L be the length of A B between the zero and highest mark of scale H. Then 1, the distance from the zero of scale H to any other mark, is given by the relation $1 = \frac{W_d}{W_s} L$. The length of L is the length that A B must have so that its resistance will be equal to a sample rod one hundred divisions of scale I in length, of conductivity one hundred per cent., and of weight W or cross-section S. If the cross-section or weight of A B is chosen arbitrarily, its length L, to correspond to a sample rod of one hundred per cent. conductivity and of arbitrarily-chosen weight, must be determined experimentally once for all by the maker, or the length L can be arbitrarily chosen and the cross-section or weight varied until the resistance of A B is right to correspond to the sample of assumed weight, length, and one hundred per cent. conductivity. The latter is done in practice by shunting A B with a small coil of copper wire which can be varied until by experiment A B is made to have the correct resistance to correspond to the resistance of a rod of weight W of length equal to one hundred divisions of the scale I and one hundred per cent. conductivity. This last value can of course be calculated.

While I have described a form of my invention in which the standard conductor is provided with a scale indicating weights, diameters, areas, &c., and the specimen conductor with a scale graduated in percentages, obviously I may reverse this arrangement—that is to say, I may provide the specimen with the scale of weights, diameters, &c., and the standard with the scale which reads in percentage conductivity direct. The result obtained will be, as far as the principle of the invention is concerned, the same.

As the object of my invention may be attained by various modifications of the specific form of apparatus herein shown, I do not confine my invention thereto; but

What I claim as my invention, and desire to secure by Letters Patent of the United States, is—

1. Apparatus for determining the specific conductivity of electrical conductors, said apparatus consisting of a bridge provided with conductivity-measuring means and a scale operating in conjunction therewith adapted to indicate directly the percentage conductivity of the conductor under test.

2. In apparatus for determining the specific conductivity of electrical conductors, the combination with a conductor of comparison standardized with relation to specific percentage conductivity, of means for comparing the resistance of a given length of the standard conductor with that of a length of specimen conductor, and means for indicating directly the specific percentage conductivity of said specimen conductor, upon the obtaining of a certain relation in resistance between a given length of said standard and a length of said specimen.

3. Apparatus for determining the specific conductivity of electrical conductors, comprising the following instrumentalities, viz: a conductor of comparison standardized with relation to specific percentage conductivity substantially as described, means for obtaining a balance in resistance between a given length of said standard conductor and a length of specimen conductor, and means adapted to indicate directly the specific percentage conductivity of said specimen upon the obtaining of said balance.

4. Apparatus for determining the specific conductivity of electrical conductors, consisting of a slide wire bridge having the following instrumentalities, viz: a conductor of comparison standardized as to specific percentage conductivity, substantially as described, sliding contacts for said standard conductor and for the specimen to be tested, means operating in conjunction with said sliding contacts for obtaining a balance in resistance between a given length of said standard conductor and a length of said specimen, a scale for the sliding contact of said standard conductor and a scale for the sliding contact of said specimen, one of said scales being provided with graduations designating as described the specimen conductor to be measured and the other of said scales graduated to indicate percentage conductivity and adapted to read directly in the percentage conductivity of the specimen conductor, upon the obtaining of said balance in resistance.

5. Apparatus for determining the specific conductivity of electrical conductors, comprising a slide wire bridge having the following instrumentalities, viz: a conductor of comparison standardized as to the specific percentage conductivity, as described, sliding contacts for the standard conductor and for the specimen conductor to be measured, means operating in conjunction with said sliding contacts for obtaining a balance in resistance between a given length of said standard and a length of said specimen, a scale for the slide of the standard conductor provided with graduations designating as described, the conductors to be measured, and a scale for the sliding contact of the specimen graduated in percentages of conductivity and adapted to indicate directly the percentage conductivity of the specimen under test, upon the obtaining of said balance in resistance.

6. A conductivity-bridge, comprising the following instrumentalities, viz: a conductor of comparison, standardized as to specific percentage conductivity, substantially as described, movable contacts for the said standard conductor and the specimen conductor to be tested, ratio resistance-coils connected to said movable contacts, a galvanometer connected to said ratio-coils as described, a conductor adapted to connect one end of the said standard conductor to a point on the specimen conductor, a source of electricity adapted to be connected across from the other ends of said standard to a point on said specimen whereby a balance may be obtained in resistance between a given length of said standard conductor and a length of said specimen conductor, a scale for the said standard conductor and its contacts, said scale being graduated as described in quantities designating the conductors to be measured, and a scale for the specimen conductor and its contacts, divided between two given points into a number of divisions designating percentage conductivity, and adapted to indicate, in conjunction with a movable contact of the specimen, the percentage conductivity of said specimen directly, upon the obtaining of said balance.

In testimony whereof I affix my signature in presence of two witnesses.

WILLIAM HOOPES.

Witnesses:
E. D. CREE,
JNO. S. SHAW.